Aug. 15, 1961 G. J. LORNSON 2,996,030
AIR POWERED WATER VEHICLE
Filed Dec. 4, 1959 2 Sheets-Sheet 1
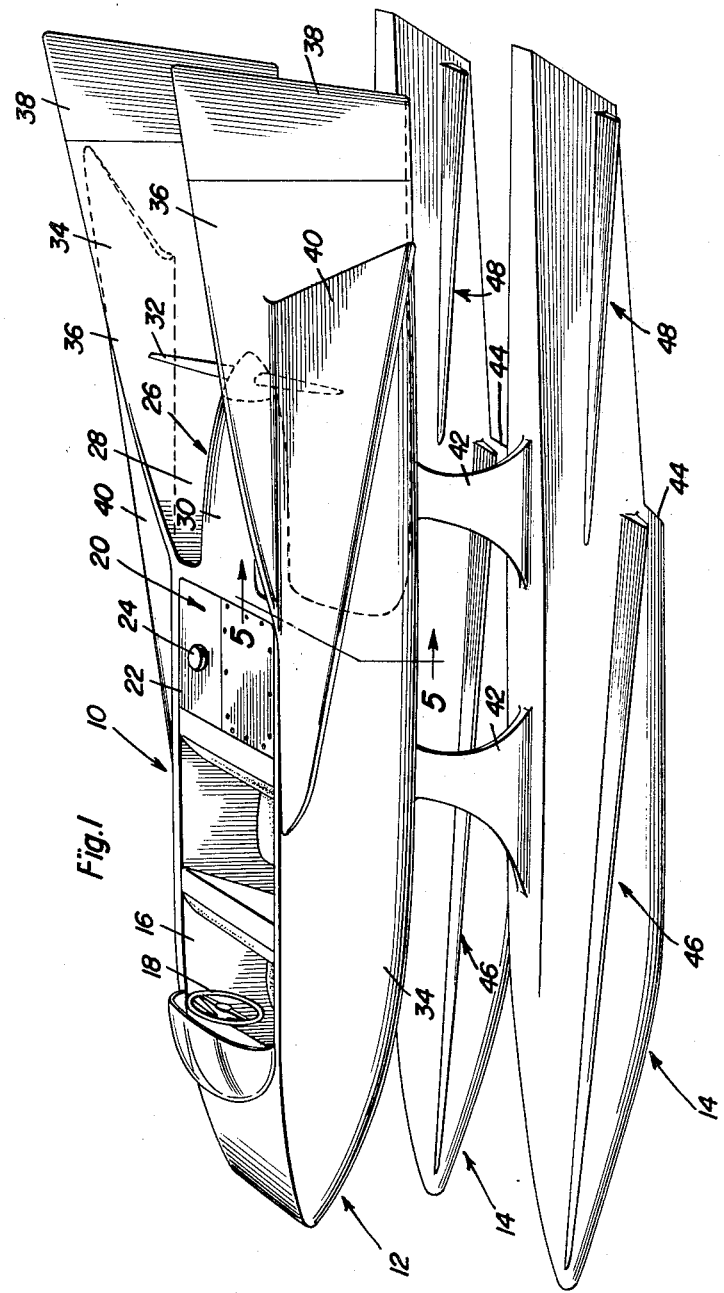
Gordon J. Lornson
INVENTOR.

Aug. 15, 1961  G. J. LORNSON  2,996,030
AIR POWERED WATER VEHICLE
Filed Dec. 4, 1959  2 Sheets-Sheet 2
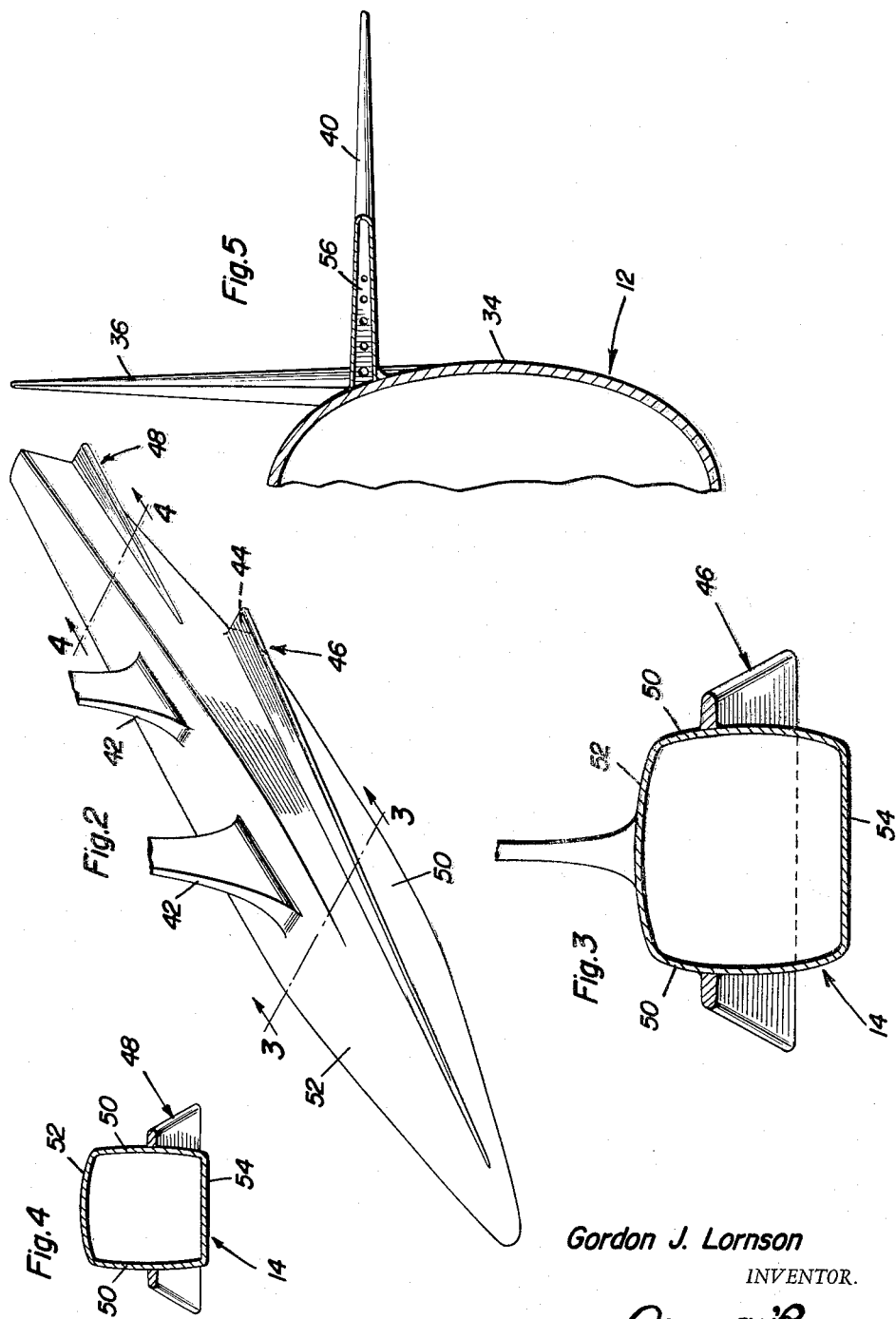
Gordon J. Lornson
INVENTOR.

United States Patent Office 2,996,030
Patented Aug. 15, 1961

2,996,030
AIR POWERED WATER VEHICLE
Gordon J. Lornson, 124 Central Ave., Fond du Lac, Wis.
Filed Dec. 4, 1959, Ser. No. 857,337
3 Claims. (Cl. 114—66.5)

This invention relates to a novel type of air powered water vehicle and more particularly to a water vehicle having a passenger carrying body portion which is supported in an elevated position by means of a pair of pontoons. The air powered vehicle is particularly adapted for use in shallow waters and in waters in which there are large quantities of marine plant life such as sea weed. The water vehicle may be powered by any suitable type of motor means which has an air propeller connected thereto for the purpose of propelling the vehicle across the surface of a body of water.

In many localities it is desired and sometimes necessary for a water vehicle to be especially well adapted for movement in shallow waters and waters having large quantities of marine plant life therein and under these circumstances it is not advantageous to use a water vehicle having the conventional form of water propeller as a means for propulsion. An air powered water vehicle is capable of successful operations in waters of these types and at the same time is capable of relatively high speeds. To reduce the water drag, the water vehicle of the instant invention has been provided with pontoons or floats which are quite like those used by many types of seaplanes. However, most seaplanes are provided with an air propeller on the forward portion thereof and inasmuch as this would be undesirable as a propulsion unit for a water vehicle having an open cockpit, the motor means and air propeller have been positioned on the aft portion of the body of the water vehicle to minimize as much as possible the movement of air passing over the cockpit of the vehicle caused by the air propeller which is utilized to propel the vehicle. Although the rear positioning of the air propeller greatly reduces the objectional excessive air flow, by having a motor means and air propeller on the aft portion of the vehicle it is extremely difficult to operate the vehicle at slow speeds without the forward portion thereof being upwardly inclined to an extent whereby the pontoons are forced to plow through the water. It is therefore the main object of this invention to provide a means for limiting the upward inclination of the forward portion of the water vehicle while it is moving at slower speeds across a surface of a body of water.

A further object, in accordance with the immediately preceding object, is to provide, a means whereby the stability of the water vehicle will be increased during operation of the vehicle at high speeds.

Still another object of this invention, in accordance with the preceding objects, is to provide a means on each of the pontoons for increasing the stability of the vehicle at all speeds.

Yet another object of this invention is to construct the body portion of the vehicle in such a manner whereby the air propeller will be at least partially shrouded to increase the safety of the vehicle.

A final object to be specifically enumerated herein is to provide an air powered water vehicle which will be of relatively simple construction and easy to operate so as to provide a device that will be economically feasible and durable as well as a device which may be operated with a high degree of safety.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the water vehicle;

FIGURE 2 is a perspective view of one of the pontoons of the water vehicle;

FIGURE 3 is an enlarged transverse vertical sectional view taken substantially upon the plane indicated by the section line 3—3 of FIGURE 2;

FIGURE 4 is an enlarged transverse vertical sectional view taken substantially upon the plane indicated by the section line 4—4 of FIGURE 2; and FIGURE 5 is an enlarged transverse vertical sectional view taken substantially upon the plane indicated by the section line 5—5 of FIGURE 1.

Referring now more specifically to the drawings the numeral 10 generally designates the air powered water vehicle comprising the present invention which includes a body portion generally designated by the reference numeral 12 that is supported by means of a pair of parallel and spaced pontoons each being generally designated by the reference numeral 14.

The body 12 is provided with a forwardly positioned cockpit 16 in which there is disposed suitable slats and controls 18 for steering the vehicle 10. Positioned aft of the cockpit 16 is a storage compartment generally designated by the reference numeral 20 in which there is disposed a fuel tank 22 having a closure cap 24 therefor. There may also be disposed in the storage compartment 20 a storage battery (not shown) and any other accessories and tools which are necessary for the operation of the motor which is generally referred to by the reference numeral 26. The aft portion of the body 12 is provided with a vertically extending rearwardly opening recess 28 in which there is disposed an engine cowling 30 which houses the motor 26. Operatively connected to the output shaft (not shown) of the motor 26 is an air propeller 32 whose outer end portions are received between the sides 34 of the body 12 which extend beyond and define a recess 28. The sides 34 of the body 12 extend rearwardly beyond the main portion of the body 12 and define upwardly inclined rudder fins 36 which each terminate at their aft end portion in a movable air rudder portion 38 which has its forward edge pivotally secured to the rear edge of the sides 34 by any convenient means for movement about a substantially vertical axis. It is to be noted that the controls 18 are operatively connected to the movable rudders 38 for the purpose of steering the vehicle 10 while it is being propelled by means of the air propeller 32. Further, if it is desired, the air propeller 32 may be of the reversible pitch type wherein the pitch of the blades may be reversed to provide a means for propelling the vehicle 10 in a reverse direction.

Secured to each of the sides 34 and extending rearwardly and outwardly therefrom are a pair of stabilizing fins 40. Each of the stabilizing fins 40 extends rearwardly from a point spaced slightly forward of midship to a point a spaced distance from the rear edge of the rudder fins 36. The stabilizing fins 40 are rearwardly and outwardly tapered as can be best seen in FIGURE 1 of the drawings.

Secured to the undersurface of the body 12 and depending therefrom are two pair of supporting struts 42 which each have secured to their lowermost end one of the pontoons 14. As heretofore pointed out each of the pontoons 14 is quite similar to the conventional type of pontoons used on certain types of seaplanes and are each provided with a step 44 to increase the planing characteristics of the pontoons.

Each pontoon 14 is provided with at least one forwardly disposed, laterally projecting and longitudinally extending pontoon riser and one rearwardly disposed laterally projecting and longitudinally extending pontoon riser. The forward pontoon risers are each generally designated by the reference numeral 46 and are secured to the pontoons 14 in any convenient manner. The rear pontoon risers are each generally referred to by the reference numeral 48 and are likewise secured to the pontoons 14 in any convenient manner. The pontoon risers 46 and 48 on each of the pontoons 14 are parallel to each other and it will be noted, see FIGURE 1 in particular, that the pontoon riser 46 extends from a point adjacent the forward end of the pontoon 14 to a point aft of the mid-portion thereof. The pontoon riser 48 on the other hand extends from a point adjacent the rear end of the pontoon riser 46 to a point spaced from the rear of the pontoon 14. The pontoon risers 46 and 48 are forwardly and upwardly inclined wherein the forward end of the pontoon riser 48 is positioned a spaced distance above the rear end of the pontoon riser 46. It will be noted that the rear pontoon risers 48 are also rearwardly and outwardly tapered.

Each of the pontoons 14 is provided with a pair of side walls 50 which are interconnected by means of top and bottom walls 52 and 54 respectively and the pontoons are constructed in a water-tight manner. Further, it is pointed out that the water line on the pontoons 14 while the vehicle 10 is at rest falls on a line which passes slightly below the forward ends of the pontoon risers 46 and 48.

In operation, as the motor 26 of the vehicle 10 is started the air propeller 32 spins which results in a thrust to move the vehicle 10 in a forward direction if the pitch of the blades of the propeller are positioned to move the boat in a forward direction upon the operation of the motor 26. As the vehicle 10 moves across the surface of a body of water, the thrust delivered by the propeller 32 combined with the resistance of the water striking the undersurfaces of the forward portions of the pontoons tends to incline the forward portions of the pontoons 14 upwardly whereupon the water drag on the pontoons 14 is sufficient to cause operation of the vehicle 10 at low speed to be uneconomical. However, the pontoon risers 46 and the pontoon risers 48 each have their rear edges positioned rearwardly of the center of gravity of the vehicle whereby the downwardly inclined and outwardly tapered rear surfaces of the pontoon risers 46 and 48 will have an upward force applied to their lower surfaces by the water over which the vehicle 10 is moving. This upward force on the lower surfaces of the pontoon risers 46 and 48 offsets the tendency of the pontoons 14 to be upwardly inclined at their forward ends whereby the vehicle 10 may be operated at low speeds without the pontoons 14 thereof plowing through the water at an angle thereto.

When higher speeds are attained just the rear portions of the pontoon risers 46 and 48 contact the water to afford additional stability to the vehicle 10. Additionally, the fins 36 and the fins 40 offer increased stability when the vehicle 10 is operating at high speed.

Thus, it may be seen that herein described is an air powered motor vehicle which may be operated at slow speeds without excessive inclination of the vehicle with respect to the surface of the water and which will be afforded additional stability while operating at high speeds by means of the fins 34 and 40 and the pontoon risers 46 and 48.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An air powered vehicle comprising a body portion, a pair of spaced and parallel pontoons, means securing said pontoons to said body in depending relation thereto, and motor means carried by the rear portion of said body having an air propeller operatively connected thereto, said pontoons each including at least one pair of forwardly disposed and longitudinally extending pontoon risers projecting laterally from opposite sides thereof and one pair of rearwardly disposed and longitudinally extending pontoon risers projecting laterally from opposite sides thereof, the forward edge of said rear risers terminating adjacent the rear edge of the forward risers and a spaced distance thereabove, said risers being substantially parallel and rearwardly and downwardly inclined, the forward edges of said risers projecting slightly above the water-line of said pontoons and the rear end of the forward risers terminating behind the center of gravity of said vehicle, said risers each being rearwardly and outwardly tapered.

2. The combination of claim 1 including a rearwardly opening vertically extending recess defined by a pair of transversely spaced and substantially vertical rearwardly projecting rudder fins carried by the rear portion of said body, said motor and said air propeller being secured in said recess, received between said rudder fins and projecting above and below the upper and lower surfaces respectively of the body, said rudder fins each having a movable rudder portion pivotally secured to the rear end thereof for movement about a vertical axis.

3. The combination of claim 2 including a passenger and operator cockpit formed in said body forwardly of said recess.

References Cited in the file of this patent

UNITED STATES PATENTS

| D. 123,463 | Silverstein | Nov. 5, 1940 |
|---|---|---|
| 538,527 | Lambert | Apr. 30, 1895 |
| 998,437 | Wieland | July 18, 1911 |
| 1,074,951 | Hunt | Oct. 7, 1913 |
| 1,075,726 | Prosser | Oct. 14, 1913 |
| 1,424,811 | Erhard | Aug. 8, 1922 |
| 1,720,167 | Clifton | July 9, 1929 |
| 1,738,979 | Adelmann | Dec. 10, 1929 |
| 1,780,998 | Curioni | Nov. 11, 1930 |
| 2,272,661 | Finley | Feb. 10, 1942 |
| 2,521,268 | Troeng | Sept. 5, 1950 |

OTHER REFERENCES

Mechanix Illustrated, issue of December 1942, pp. 46–51 relied on.